US009960841B2

(12) United States Patent
Yamane

(10) Patent No.: US 9,960,841 B2
(45) Date of Patent: May 1, 2018

(54) OPTICAL-TRANSCEIVER CONTROL CIRCUIT, OPTICAL NETWORK SYSTEM, AND OUTPUT CONTROL METHOD OF OPTICAL-TRANSCEIVER

(71) Applicant: NEC CORPORATION, Tokyo (JP)

(72) Inventor: Takashi Yamane, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days. days.

(21) Appl. No.: 15/129,052

(22) PCT Filed: Feb. 27, 2015

(86) PCT No.: PCT/JP2015/001038
§ 371 (c)(1),
(2) Date: Sep. 26, 2016

(87) PCT Pub. No.: WO2015/145986
PCT Pub. Date: Oct. 1, 2015

(65) Prior Publication Data
US 2017/0111107 A1   Apr. 20, 2017

(30) Foreign Application Priority Data
Mar. 27, 2014 (JP) .................. 2014-065990

(51) Int. Cl.
H04B 10/03 (2013.01)
H04B 10/40 (2013.01)

(52) U.S. Cl.
CPC ............ *H04B 10/03* (2013.01); *H04B 10/40* (2013.01)

(58) Field of Classification Search
CPC .................................................. H04B 10/03
See application file for complete search history.

(56) References Cited

U.S. PATENT DOCUMENTS 7,809,275 B2 * 10/2010 Aronson ............... H04B 10/40
370/217
2003/0048508 A1 * 3/2003 Yu .......................... H04B 10/506
398/91
(Continued)

FOREIGN PATENT DOCUMENTS

JP      6-132892 A     5/1994
JP      2000-92017 A   3/2000
(Continued)

OTHER PUBLICATIONS

International Search Report for PCT/JP2015/001038 dated Mar. 31, 2015.
(Continued)

*Primary Examiner* — Shi K Li
(74) *Attorney, Agent, or Firm* — Sughrue Mion, PLLC

(57) ABSTRACT

This invention solves the problem that, if a loss of signal or other anomaly occurs on a line side, intermittent problems occur in a signal outputted to a client side, resulting in trouble with subsequent signal processing. This optical-transceiver control circuit comprises a signal-generating means for generating a dummy signal that has approximately the same characteristics as an electrical signal generated from an optical signal inputted to an optical transceiver, a switching means for receiving an electrical signal and selecting and outputting either the received electrical signal or the generated dummy signal, and a controlling means for changing the signal selected by the switching means from the electrical signal to the dummy signal if a notification indicating an anomaly in the optical signal is inputted.

8 Claims, 6 Drawing Sheets

(56) References Cited

U.S. PATENT DOCUMENTS

2009/0297161 A1    12/2009  Ojima
2011/0293047 A1*   12/2011  Yamabana ............. H04B 10/69
                                                        375/340

FOREIGN PATENT DOCUMENTS

| JP | 2002261718 A | 9/2002 |
| JP | 2005-167935 A | 6/2005 |
| JP | 2009-290256 A | 12/2009 |
| JP | 2011211288 A | 10/2011 |
| JP | 2013258471 A | 12/2013 |
| WO | 2010/103576 A1 | 9/2010 |

OTHER PUBLICATIONS

Written Opinion for PCT/JP2015/001038 dated Mar. 31, 2015.
Office Action dated Mar. 6, 2018 in Japanese Patent Application No. 2016-509957.

* cited by examiner

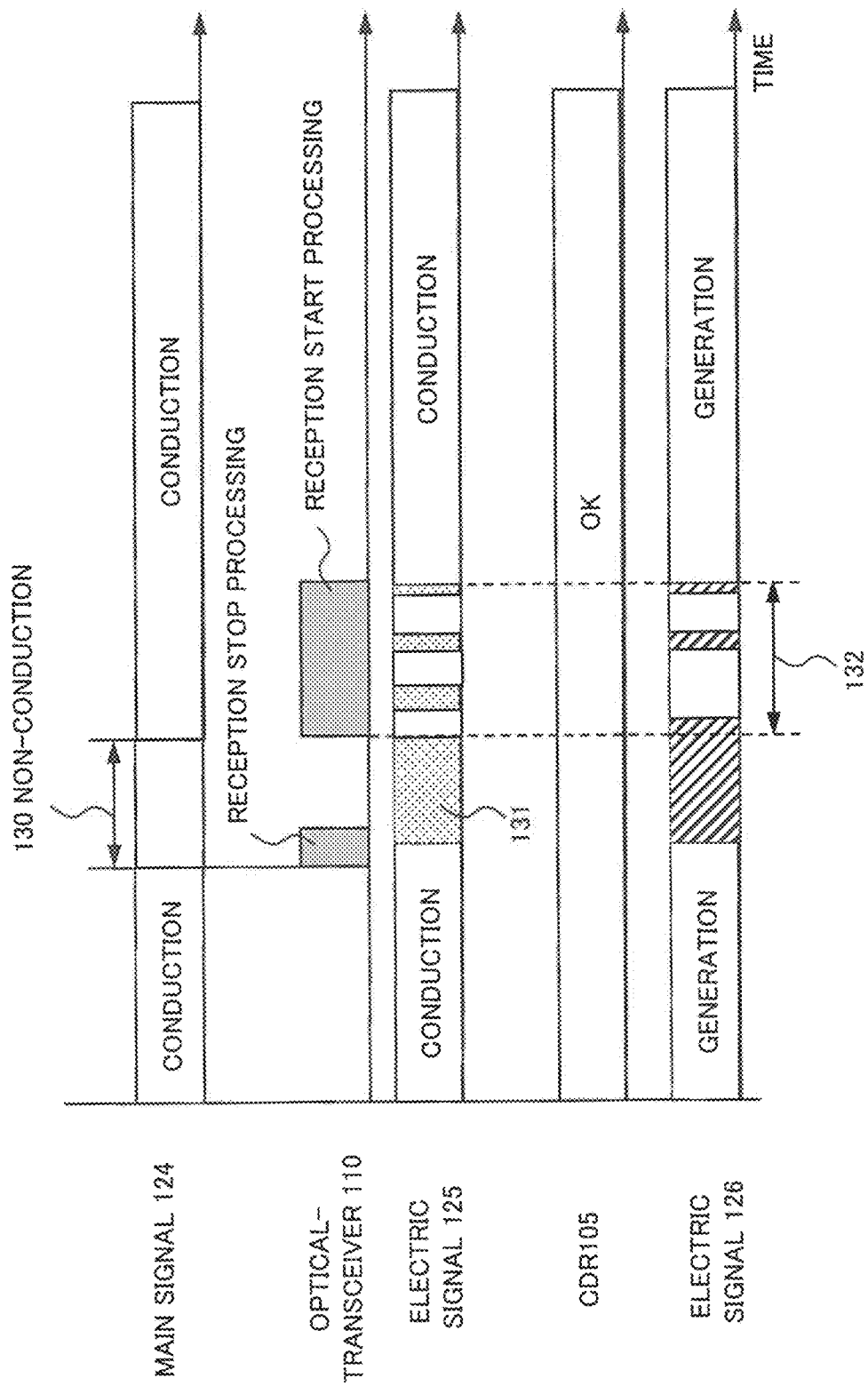

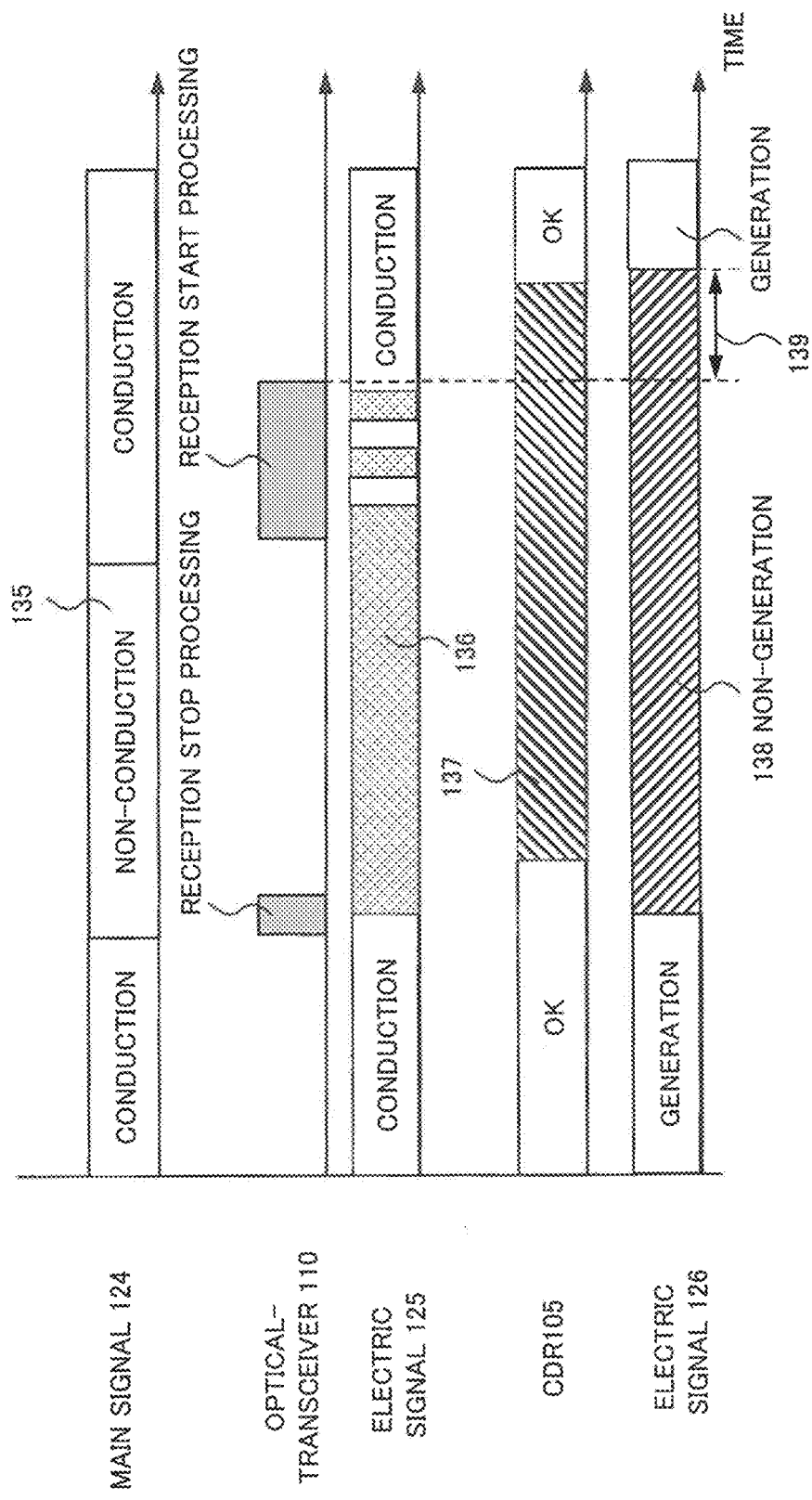

OPTICAL-TRANSCEIVER CONTROL CIRCUIT, OPTICAL NETWORK SYSTEM, AND OUTPUT CONTROL METHOD OF OPTICAL-TRANSCEIVER

CROSS REFERENCE TO RELATED APPLICATIONS

This application is a National Stage of International Application No. PCT/JP2015/001038 filed Feb. 27, 2015, claiming priority based on Japanese Patent Application No. 2014-065990 filed Mar. 27, 2014, the contents of all of which are incorporated herein by reference in their entirety.

TECHNICAL FIELD

The present invention relates to an optical-transceiver control circuit, an optical network system, and an output control method of an optical-transceiver, and more particularly, relates to an optical-transceiver control circuit, an optical network system, and an output control method of an optical-transceiver used for a mission-critical optical network.

BACKGROUND ART

The optical-transceiver is a circuit module incorporated into an optical transponder, and performs bidirectional optical communication by using an optical fiber by performing electrical-optical conversion of an electric signal. A transmission and reception operation of information using an optical-transceiver will be explained with reference to FIG. 4.

FIG. 4 is a block configuration diagram illustrating a related line card. The line card is disposed between a line (network) and a client, and includes an interface of information input and output. In FIG. 4, the line card is constituted by a framer 100 and an optical-transceiver 110.

In a case where information is transmitted from the client side to the line side, the framer 100 applies multiplexing process for the line side transmission to an electric signal 121 received from the client, and structures a frame. Thereafter, the framer 100 converts it into a transmission format (for example, SFI: Serdes Framer Interface) between the framer 100 and the optical-transceiver 110, and outputs the electric signal 122 to the optical-transceiver 110.

In this case, the electric signal 121 from the client side is a signal that is, e.g., multiplexed for an optical signal according to, for example, Synchronous Transport Module (STM) in Synchronous Digital Hierarchy (SDH) specification, and the electric signal 121 has an optical channel transmission speed and the like defined by Optical channel Transport Unit (OTU). It should be noted that the electric signal 121 may be a signal based on other specifications such as Gigabit Ether.

The optical-transceiver 110 converts the input electric signal 122 into an optical signal in a format for line side transmission, and outputs the main signal 123 optically modulated according to the format to the line side.

On the other hand, in a case where information is transmitted from a network structured by an optical fiber and the like to the client side, the processing opposite to the above processing is performed. More specifically, the optical-transceiver 110 receives the main signal 124, i.e., the optical signal, from the line side, converts it into an electric signal, and outputs the electric signal 125 to the framer 100. The framer 100 performs signal processing such as frame conversion on the input electric signal 125, and thereafter outputs an electric signal 126 including information about the main signal 124 to the client side.

In this case, in a case where an abnormality such as communication interruption occurs in an optical fiber at the line side, the optical-transceiver 110 is unable to receive the main signal 124, and is unable to normally generate the electric signal 125 which is to be output to the framer 100. In this case, depending on an LSI (Large Scale Integration) constituting the framer 100, the electric signal 126 which is output to the client side is stopped intermittently or completely.

PTL 1 discloses an optical transmission apparatus transmitting an AIS (Alarm Indication Signal) signal indicating an occurrence of a malfunction in a case where a frequency skip of an input signal occurs due to communication interruption at the line side. The optical transmission apparatus of PTL 1 is constituted by an optical transmission and reception unit including a detection unit for detecting communication interruption at the line side and an electric signal processing unit. Further, the optical transmission apparatus includes a network side transmission PLL (Phase Locked Loop) unit including a voltage control oscillation unit, a clock switch control unit, a selector, and a frequency dividing unit.

In a case where a communication interruption occurs at the line side, the optical transmission apparatus is configured such that a detection unit of the optical transmission and reception unit detects the communication interruption, and accordingly, the clock switch control unit controls the selector to switch the connection destination from the electric signal processing unit to the output side of the network side transmission PLL unit. More specifically, the output of the voltage control oscillation unit of the network side transmission PLL unit is switched to a clock obtained by dividing the frequency by four. A frequency dividing unit disposed at a stage subsequent to the selector divides the frequency by 255. As a result, the amount of variation in the phase before and after the switching is compressed to 1/255. Therefore, the electric signal processing unit using the frequency in which a frequency skip, i.e., the amount of variation in the phase, is suppressed can transmit a stable AIS signal.

CITATION LIST

Patent Literature

[PTL 1] Japanese Patent Laid-Open Publication No. 2009-290256

SUMMARY OF INVENTION

Technical Problem

In a case where communication interruption occurs at the line side, the optical transmission apparatus described in PTL 1 can stably transmit the AIS signal. However, when the main signal is no longer input into the optical transmission and reception unit, the frequency of the electric signal and a mark ratio (a ratio of marks included in a predetermined time period) are not determined.

In a case where the framer 100 is configured as a Forward Error Correction (FEC) decoder, or in a case where the framer 100 is applied to a digital coherent optical-transceiver that is rapidly widely spread in recent years, it took some time to perform conduction start processing of the main signal 124 in the optical-transceiver 110, which unstabilizes the electric signal 126 that is output from the framer 100.

A specific signal processing in the line card as described above will be explained with reference to FIG. 5A, FIG. 5B. FIG. 5A is a timing chart in a case where the non-conduction time of the main signal 124 received from the line side is a short time period, and unlock of a Clock-Data-Recovery (CDR) does not occur. On the other hand, FIG. 5B is a timing chart in a case where the non-conduction time of the main signal 124 received from the line side is a long time period, and unlock of a Clock-Data-Recovery (CDR) occurs. Both of FIGS. 5A and 5B indicate, from the top row, the state of the main signal 124 received from the line side, internal processing of the optical-transceiver 110 according to communication interruption, the state of the electric signal 125, the state of the CDR 105, and the state of the electric signal 126.

It should be noted that the framer 100 is constituted by an FEC decoder, and the CDR 105 is provided at the input end where the electric signal 125 is input. The CDR 105 extracts a reference clock from information of the main signal 124 included in the input electric signal 125, and then, signal processing is performed in the framer 100.

In FIG. 5A, when the main signal 124 is no longer input from the line side (NON-CONDUCTION 130), the optical-transceiver 110 performs reception stop processing. Accordingly, the electric signal 125 including information about the main signal 124 is not output from the optical-transceiver 110 (region 131). In a case where the time in which the main signal 124 is in the non-conduction 130 is short, unlock does not occur in the CDR 105 (OK). Since the electric signal 125 including information about the main signal 124 is not output from the optical-transceiver 110, the framer 100 does not generate the electric signal 126 (diagonal lines).

When the communication interruption is recovered, and the input of the main signal 124 from the line side is resumed (CONDUCTION at the right side), the optical-transceiver 110 starts the reception start processing. Accordingly, the electric signal 125 intermittently repeats a conduction (blank) and a non-conduction (hatching). In a case where a digital coherent optical-transceiver and the like is applied to the optical-transceiver 110, calibration in an analog-digital conversion device and signal processing in a phase modulation and demodulation device are complicated than signal processing in a generally-available analog optical-transceiver and take more time to perform those processing. In this case, during the reception start processing at the optical-transceiver 110, the electric signal 126 may be intermittently generated (blank) or not generated (diagonal lines) (time lag 132).

On the other hand, in FIG. 5B, when the main signal 124 is no longer input from the line side (NON-CONDUCTION 135), the optical-transceiver 110 performs the reception stop processing. Accordingly, the electric signal 125 including information about the main signal 124 is not output from the optical-transceiver 110 (region 136). In this case, when the state of the non-conduction 135 continues for a long time, the reference clock cannot be extracted from the information about the main signal 124, and therefore, unlock occurs in the CDR 105 (region 137). More specifically, Loss-Of-Lock occurs. Since the electric signal 125 including information about the main signal 124 is not output from the optical-transceiver 110, the framer 100 does not generate the electric signal 126 (NON-GENERATION 138).

Then, when the communication interruption is recovered, and the input of the main signal 124 from the line side is resumed (CONDUCTION at the right side), the optical-transceiver 110 starts the reception start processing. Accordingly, the electric signal 125 intermittently repeats a conduction (blank) and a non-conduction (hatching).

Since the unlock occurs in the CDR 105, the reference clock is extracted from the information about the main signal 124 at the line side, and the signal processing within the CDR 105 is re-pulled into the clock. After the electric signal 125 including information about the main signal 124 is output from the optical-transceiver 110, the framer 100 resumes the generation of the electric signal 126 (waiting time period 139), the unlock in the CDR 105 is solved, and thereafter, the output of the electric signal 126 is resumed (GENERATION at the right side). More specifically, the waiting time period 139 matches the re-pull-in time of the signal processing in the CDR 105.

When a summation of the time periods of the non-generation 138 and the waiting time period 139 becomes longer, the specification of the optical network system may not be satisfied. More specifically, it may not be able to satisfy the switching time required in the specification of high-speed digital communication method (Synchronous Digital Hierarchy; SDH) standardized in Telecommunication Standardization Sector (ITU-T) of International Telecommunication Union (ITU). More specifically, in an optical network system having an auxiliary optical fiber, a switching time to the auxiliary optical fiber when, e.g., communication interruption occurs is defined to be 50 ms or less in a setting parameter called "switch time".

The framer 100 cannot generate the electric signal 126 not only when communication interruption occurs at the line side but also when a loss of the main signal 124 occurs, a loss of a frame occurs, or a synchronization loss of a frame occurs.

As described above, a highly accurate optical-transceiver used in a digital coherent method, it takes some time to perform reception start processing, and therefore, an unstable electric signal 126 is output in the reception start processing time period, and this may be the cause of failure in signal processing in a subsequent stage. Further, in a case where the unlock of the CDR 105 occurs, it takes time to resume the output of the electric signal 126 (waiting time period 139), and this may increase the occasion of failing to satisfy the specification.

It is an object of the invention of the present application to provide an optical-transceiver control circuit, an optical network system, and an output control method of an optical-transceiver capable of suppressing an intermittent output of a signal to a client side and capable of recovering in a short period of time in a case where an abnormality such as communication interruption occurs at a line side.

Solution to Problem

In order to achieve the above object, an optical-transceiver control circuit according to the present invention includes signal generation means for generating a dummy signal having approximately the same property as an electric signal generated from an optical signal that is input to an optical-transceiver, switch means for receiving the electric signal and selecting and outputting any one of the received electric signal and the generated dummy signal, and control means for changing a selection target of the switch means from the electric signal to the dummy signal when a notification indicating abnormality of the optical signal is input.

In order to achieve the above object, an optical network system according to the present invention includes an optical-transceiver including transmission and reception means for transmitting and receiving an optical signal, signal processing means for converting an optical signal received by the transmission and reception means into an electric signal, and outputting the electric signal, and signal generation means for generating a dummy signal having approximately the same property as the electric signal, and switch means for selecting and outputting any one of the electric signal and the dummy signal, and a network management unit for changing the selection target of the switch means from the electric signal to the dummy signal when a notification indicating abnormality of the optical signal is input.

In order to achieve the above object, an output control method of an optical-transceiver according to the present invention includes receiving an electric signal generated from an optical signal that is input to an optical-transceiver, generating a dummy signal having approximately the same property as the electric signal, changing an output target from the electric signal to the dummy signal when a notification indicating abnormality of the optical signal is input.

Advantageous Effects of Invention

According to the present invention, an optical-transceiver control circuit, an optical network system, and an output control method of an optical-transceiver capable of suppressing an intermittent output of a signal to a client side and capable of recovering in a short period of time in a case where an abnormality such as communication interruption occurs at a line side can be provided.

BRIEF DESCRIPTION OF DRAWINGS

FIG. 5A is a timing chart illustrating a related line card.
FIG. 5B is a timing chart illustrating a related line card.

DESCRIPTION OF EMBODIMENTS

Hereinafter, an exemplary embodiment of the present invention will be explained in details.

First Exemplary Embodiment

Figure 1:
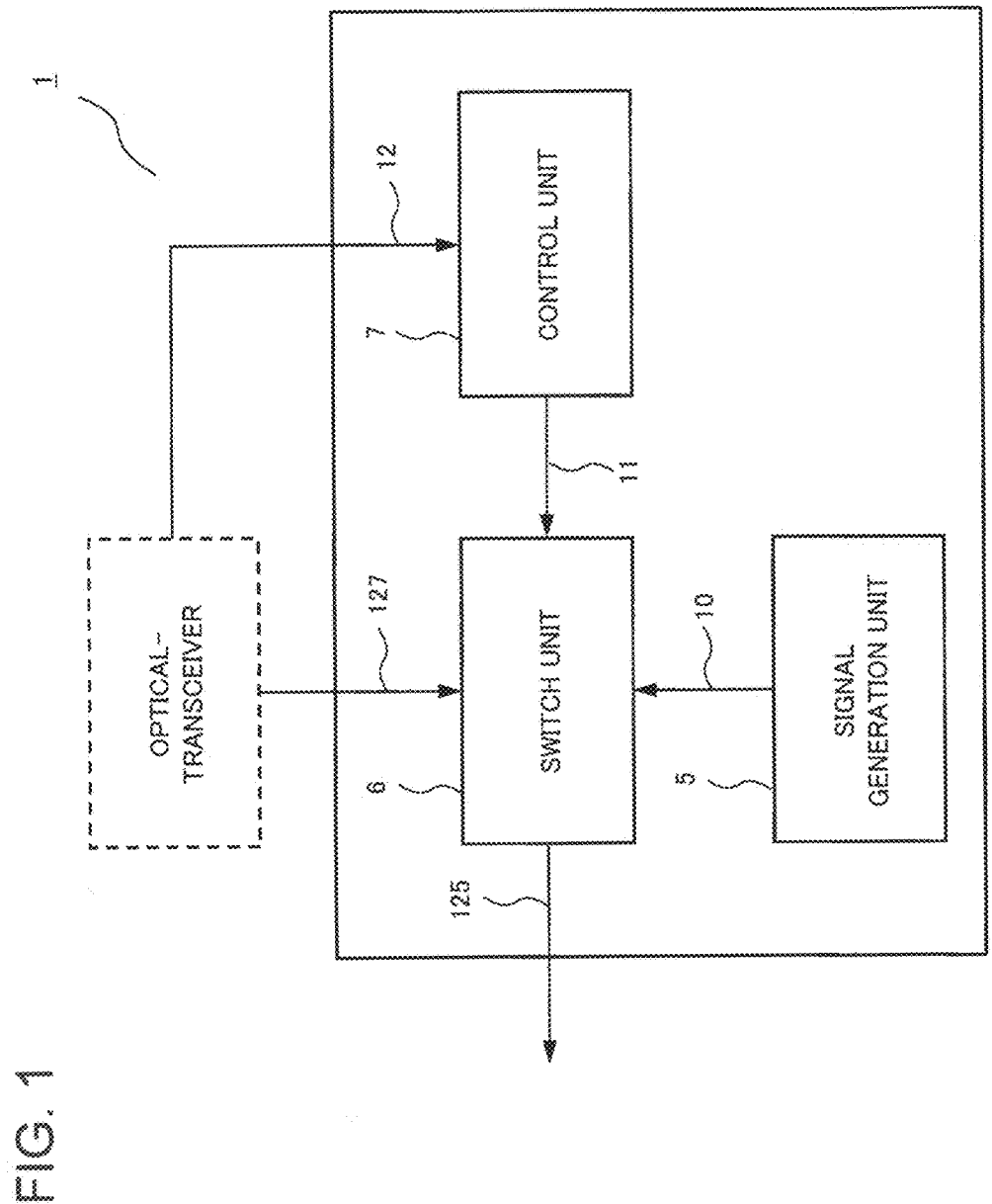
FIG. 1 is a block configuration diagram illustrating an optical-transceiver control circuit 1 according to a first exemplary embodiment.

A first exemplary embodiment of the present invention will be explained in details with reference to drawings. FIG. 1 is a block configuration diagram illustrating an optical-transceiver control circuit 1 according to the first exemplary embodiment. The optical-transceiver control circuit 1 controls the output from the optical-transceiver. FIG. 1 illustrates an example in which the optical-transceiver control circuit 1 is configured separately from the optical-transceiver, but the optical-transceiver control circuit 1 may also be disposed in the inside of the optical-transceiver.

In this case, the optical-transceiver includes a function of converting an electric signal received from the client side into an optical signal and outputting the optical signal to a line side and a function of converting an optical signal received from the line side into an electric signal and outputting the electric signal to a client side. The optical-transceiver can be constituted by, for example, a Serializer/De-Serializer (SerDes) which is a circuit for converting serial and parallel to and from each other and a DSP (Digital Signal Processor) for digital coherent including an analog-signal processing unit which includes an optical transmission and reception device, and a digital signal modulation and demodulation unit.

The optical-transceiver according to the first exemplary embodiment receives an optical signal including information from the line side, converts the optical signal into an electric signal, and outputs the reception signal 127 to the optical-transceiver control circuit 1. The optical-transceiver further outputs a monitor signal 12 including a monitor result of a communication state at the line side to the optical-transceiver control circuit 1. For example, in a case where the digital signal modulation and demodulation unit detects abnormality at the line side, the optical-transceiver incorporates abnormality information such as OOF (Out-Of-Frame), LOF (Loss-Of-Frame), LOS (Loss-Of-Signal), and the like into the monitor signal 12, and outputs the monitor signal 12 to the optical-transceiver control circuit 1. In this case, the OOF is information indicating frame synchronization loss, LOF is information indicating loss of overview of a frame, and LOS is information indicating loss of an optical signal.

In FIG. 1, the optical-transceiver control circuit 1 includes a signal generation unit 5, a switch unit 6, and a control unit 7.

The signal generation unit 5 generates a dummy signal 10 having the same transfer speed as the reception signal 127 received from the optical-transceiver. In the first exemplary embodiment, the signal generation unit 5 forcibly generates an alarm indication signal (AIS: Alarm Indication Signal) which is a signal having the same transfer speed as the transfer speed of the reception signal 127 generated by the optical-transceiver, and adopts this AIS signal as the dummy signal 10. In this case, the signal generation unit 5 can start generation of the dummy signal 10 upon receiving a generation command signal of the dummy signal 10 from the control unit 7, or can start an output of the dummy signal 10 generated in advance upon receiving an output command signal.

A generally-available microcomputer, a generally-available DSP, and the like can be applied to the control unit 7. The control unit 7 controls the switch unit 6 based on the monitor result of the communication state at the line side that is input from the optical-transceiver. The optical-transceiver and the control unit 7 communicate by using a serial interface such as, e.g., parallel interface, Serial Peripheral Interface (SPI), and Inter-Integrated Circuit.

In a case where the control unit 7 receives a monitor signal 12 including abnormality information such as OOF, LOF, and LOS from the optical-transceiver, the control unit 7 determines that a normal reception signal 127 is not input from the optical-transceiver. Then, the control unit 7 outputs, to the switch unit 6, a command signal 11 including command information for switching the output to the subsequent stage of the optical-transceiver from the reception signal 127 to the dummy signal 10.

When the monitor signal 12 no longer includes abnormality information (OOF, LOF, LOS, and the like), the control unit 7 determines that the optical-transceiver is ready to output a normal reception signal 127. Then, the control unit 7 outputs, to the switch unit 6, a command signal 11 including command information for returning the output to the subsequent stage of the optical-transceiver from the dummy signal 10 to the reception signal 127.

The switch unit 6 receives the reception signal 127 from the optical-transceiver and receives the dummy signal 10 from the signal generation unit 5. The switch unit 6 selects any one of the reception signal 127 and the dummy signal 10 based on the switch information included in the command signal 11 received from the control unit 7, and outputs the any one of the reception signal 127 and the dummy signal 10 as the electric signal 125 to the subsequent stage of the optical-transceiver (for example, a framer not shown).

Subsequently, an operation procedure of the optical-transceiver control circuit 1 will be explained with reference to FIG. 2. Hereinafter explained is a case where the electric signal 125 that is output from the switch unit 6 of the optical-transceiver control circuit 1 is input into the framer provided with a Clock-Data-Recovery (CDR) at an input end. The signal generation unit 5 of the optical-transceiver control circuit 1 generates the above AIS signal as the dummy signal 10.

Figure 2:
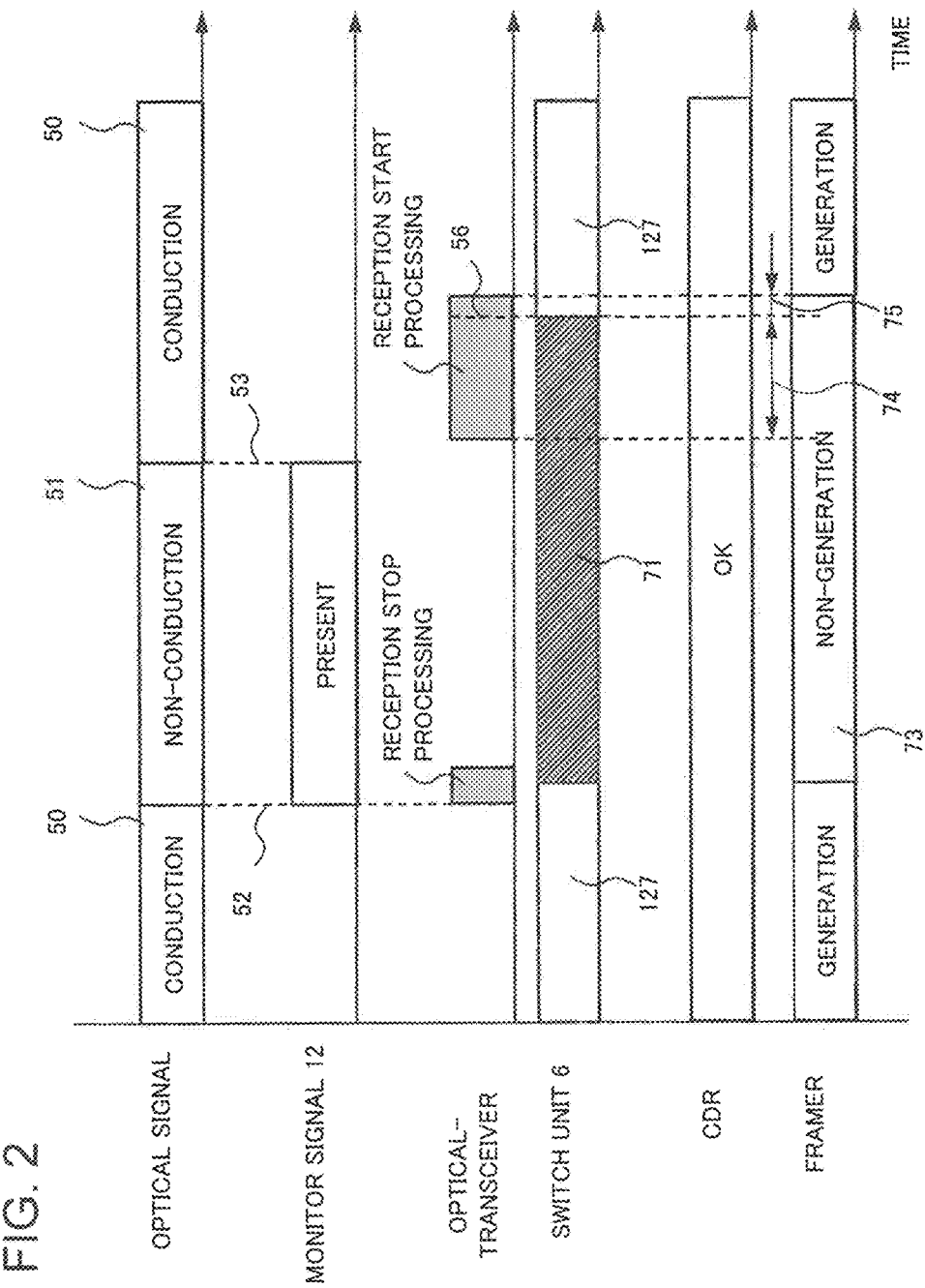
FIG. 2 is a timing chart illustrating an optical-transceiver control circuit 1 according to the first exemplary embodiment.

FIG. 2 is a time chart illustrating the optical-transceiver control circuit 1 according to the first exemplary embodiment. FIG. 2 illustrates, from the top row, the state of the optical signal received from the line side, presence/absence of abnormality information included in the monitor signal 12, internal processing of the optical-transceiver according to communication interruption, internal processing of the switch unit 6, the state of the CDR, and the internal processing of the framer. Hereinafter, a description referred to in FIG. 2 corresponding to operation of the optical-transceiver control circuit 1 will be shown in the parentheses.

When an optical signal is normally input from the line side (CONDUCTION 50 at the left side of "OPTICAL SIGNAL"), the monitor signal 12 received by the optical-transceiver control circuit 1 does not include any abnormality information, for example, OOF, LOF, LOS, and the like. At this occasion, the switch unit 6 selects the reception signal 127 received from the optical-transceiver, and outputs it as the electric signal 125 to the framer. The CDR is normally functioning ("OK" in the time period of the CONDUCTION 50 of "CDR"). Then, the reception signal 127 including information about the optical signal is output to the frame as the electric signal 125, so that the framer generates an electric signal for transmitting information included in the reception signal 127 (GENERATION at the left side of "FRAMER").

Subsequently, when an optical signal is no longer input from the line side due to communication interruption and the like (NON-CONDUCTION 51 of "OPTICAL SIGNAL"), the optical-transceiver performs the reception stop processing, and outputs the monitor signal 12 including abnormality information such as OOF, LOF, LOS, and the like to the optical-transceiver control circuit 1 (PRESENT of "MONITOR SIGNAL 12") during a time period in which an abnormality occurs (time 52 to time 53).

When the control unit 7 of the optical-transceiver control circuit 1 receives a monitor signal 12 including abnormality information, the control unit 7 of the optical-transceiver control circuit 1 determines that a normal reception signal 1127 is not input from the optical-transceiver, and outputs, to the switch unit 6, a command signal 11 including command information for switching the output to the framer from the reception signal 127 to the dummy signal 10 (AIS signal 71 of "SWITCH UNIT 6"). In this case, the control unit 7 gives the switch command to the AIS signal 71 before the framer can no longer obtain information included in the reception signal 127.

The switch unit 6 switches the electric signal 125, which is output to the framer, from the reception signal 127 to the AIS signal 71 based on the command information of the command signal 11. At this occasion, the AIS signal 71 is the signal of the same transfer speed as the reception signal 127, and therefore, unlock does not occur in the CDR ("OK" corresponding to the time period of the NON-CONDUCTION 51 of "CDR").

On the other hand, since the AIS signal 71 does not include the information that is included in the optical signal given from the line side, the framer stops generation of an electric signal which is to be output to the client side (NON-GENERATION 73 of "FRAMER").

Then, when communication interruption and the like is recovered, and an input of an optical signal from the line side is resumed (CONDUCTION 50 at the left side of "OPTICAL SIGNAL"), the optical-transceiver starts the reception start processing of the optical signal and starts the output of the monitor signal 12 not including any abnormality information such as OOF, LOF, LOS, and the like.

The control unit 7 starts measuring the time when the abnormality information included in the monitor signal 12 switches from "present" to "absent" (time 53), and after a predetermined period of time passes (time 56), the command signal 11 including the command information for returning the output to the framer from the AIS signal 71 to the reception signal 127 is output to the switch unit 6. In this case, before the reception start processing in the optical-transceiver (time 74+time 75) is completed, the control unit 7 according to the first exemplary embodiment outputs, to the switch unit 6, the command signal 11 including the command information for switching to the reception signal 127 (time 56). Therefore, a normal reception signal 127 is output to the framer immediately after the reception start processing is completed.

The switch unit 6 switches the electric signal 125, which is output to the framer, from the AIS signal 71 to the reception signal 127, based on the command information of the command signal 11, at a time 56 which is a time before the reception start processing is completed.

At this occasion, since the reception signal 127 is a signal of the same transfer speed as the AIS signal 71, unlock does not occur in the CDR ("OK" in the time period of the CONDUCTION 50 at the right side of "CDR"). Since unlock does not occur in the CDR, the framer can resume the generation of the electric signal for transmitting information included in the reception signal 127 immediately after the reception start processing in the optical-transceiver is completed. FIG. 2 illustrates an example where the reception start processing completion time point at the optical-transceiver and the generation resume time of the electric signal at the framer are at the same time. Alternatively, after the reception signal 127 including information included in the optical signal is input from the optical-transceiver, the framer may resume the generation of the electric signal.

As described above, in a case where an abnormality such as communication interruption occurs in the configuration according to the first exemplary embodiment, the electric signal 125 that is output to the framer is switched from the reception signal 127 to the dummy signal 10 (AIS signal 71) not including the information included in the optical signal. Therefore, even in a case where the communication interruption continues for a long time, this can reduce the occasion of unlock in the CDR, and can reduce the time from when the optical-transceiver completes the reception start processing to when the framer resumes the generation of the electric signal (the waiting time period 139 of FIG. 5B explained in Background Art). Therefore, the time period in which the electric signal for transmitting information included in the reception signal 127 is not output from the framer is within 50 ms which is a condition of "switch time" of the specification (ITU-T G.841).

Then, in the configuration according to the first exemplary embodiment, the switch unit 6 outputs the AIS signal 71 instead of the reception signal 127 in the time 74 which is most of the time period of the reception start processing performed at the optical-transceiver. Accordingly, this reduce the occasion that the framer intermittently repeats generation and non-generation of the electric signal which is to be output to the client side. Therefore, an unstable main signal leaking from the framer to the client side can be suppressed.

Before the optical-transceiver completes the reception start processing, the electric signal 125 that is output to the framer is returned back to the reception signal 127, and therefore, the reception processing at the framer can be restored without affecting the signal processing of the framer, and the framer can resume generation of the electric signal without delaying from the reception start processing completion.

In the above exemplary embodiment, the time 75 from the time 56 of switching from the AIS signal 71 to the reception signal 127 to the end time of the reception start processing is adopted as a predetermined time, but the time 75 can be zero (the time 56 and the end time of the reception start processing are the same time). Further, the switching from the AIS signal 71 to the reception signal 127 may be done after the input of the normal reception signal 127 including the information about the optical signal is resumed.

In the above exemplary embodiment, the abnormality information included in the monitor signal 12 is information about OOF, LOF, and LOS included in the main signal, but the exemplary embodiment is not limited thereto. A received light unit (not shown) provided in an optical-transceiver detects received light power of the received optical signal, and when the received light unit detects a decrease in the received light power, abnormality information may be generated and incorporated into the monitor signal 12.

Further, in the above exemplary embodiment, an AIS signal is shown as an example of a dummy signal, but the exemplary embodiment is not limited thereto. A program pattern (Programmable Pattern) signal that is set in advance, and a signal and the like having the same characteristics as the reception signal 127 including a clock signal and the like may be used as the dummy signal. In this case, the program pattern is a Pseudo-random Binary Sequence (PRBS) and the like which is a pseudo random pattern. More specifically, any of these signals may be the same as the main signal which is the optical signal, or in a case where the frequency deviation is sufficiently small, the signal may be a signal having a bit rate close enough so that it can be recognized by the CDR as being the same as the reception signal 127, and for example, a signal and the like of which mark ratio, instead of the bit rate, is close to 0.5 may be used.

Second Exemplary Embodiment

Figure 3:
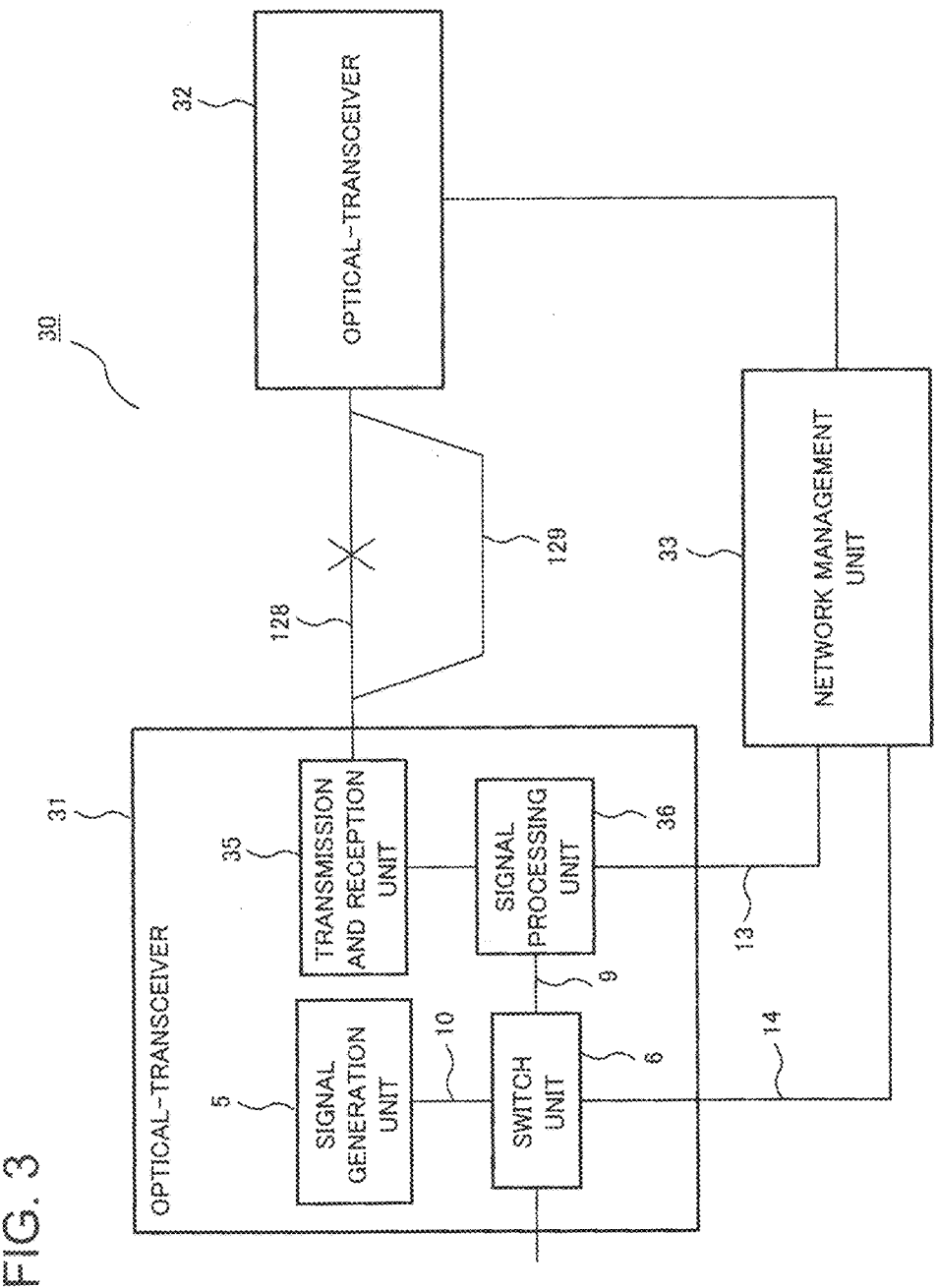
FIG. 3 is a system configuration diagram illustrating an optical network system 30 according to a second exemplary embodiment.
Figure 4:
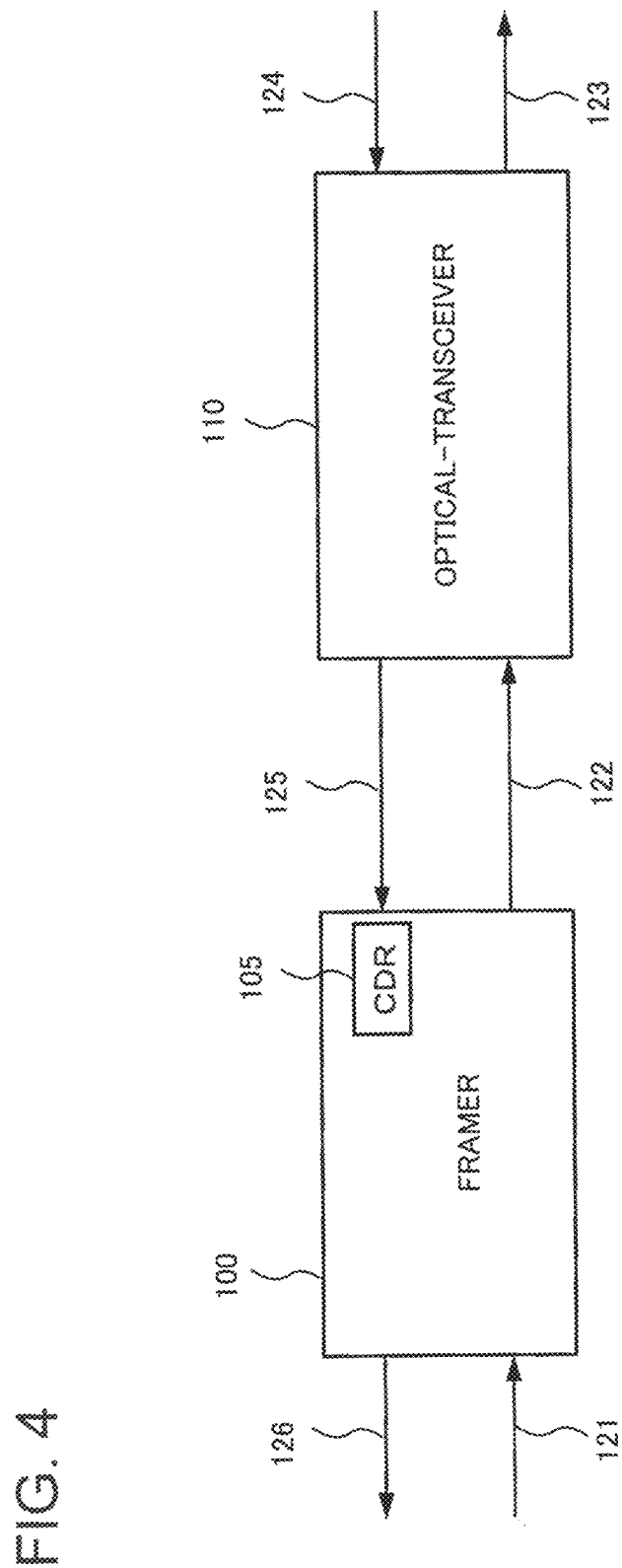
FIG. 4 is a block diagram illustrating a configuration of a related line card.

The second exemplary embodiment will be explained with reference to drawings. FIG. 3 is a system configuration diagram of an optical network system according to the second exemplary embodiment. The optical network system 30 includes two optical-transceivers 31, 32, and a network management unit 33. Each of the optical-transceivers 31, 32 includes a transmission and reception unit 35, a signal processing unit 36, a signal generation unit 5, and a switch unit 6. The signal generation unit 5 and the switch unit 6 function in the same manner as the signal generation unit 5 and the switch unit 6 of FIG. 1 explained in the first exemplary embodiment. In FIG. 3, the internal configuration of only the optical-transceiver 31 has been shown. But the optical-transceiver 32 is also configured in the same manner.

The switch unit 6 of the optical-transceivers 31, 32 is connected to the framer, not shown. Information about a communication service from the client side is transmitted and received to and from the line side via the framer and optical-transceivers 31, 32.

An electric signal from the signal processing unit 36 is input to the transmission and reception unit 35, and the transmission and reception unit 35 converts the electric signal to the optical signal, and thereafter, transmits the optical signal to a currently used system optical fiber 128 which is a line side. The transmission and reception unit 35 receives an optical signal from the currently used system optical fiber 128 which is the line side, converts the received optical signal into an electric signal including information about the received optical signal, and outputs the electric signal to the signal processing unit 36.

The signal processing unit 36 receives the electric signal including information of the client side from the switch unit 6, converts the electric signal into a signal format that can be transmitted at the line side, and performs signal processing such as pre-equalization, and thereafter outputs the electric signal to the transmission and reception unit 35. On the other hand, the signal processing unit 36 receives the electric signal including information included in the main signal from the transmission and reception unit 35, converts the electric signal into a signal format that can be transmitted to the framer, performs signal processing such as dispersion compensation and phase compensation, and thereafter, outputs the signal as a reception signal 9 to the switch unit 6.

The signal processing unit 36 monitors the electric signal received from the transmission and reception unit 35, so that the signal processing unit 36 obtains the state of the currently used system optical fiber 128 used for communication, and outputs the obtained result as the monitor signal 13 to the network management unit 33. In a case where the signal processing unit 36 detects abnormality such as communication interruption from the electric signal received from the transmission and reception unit 35, the signal processing unit 36 incorporates the abnormality information into the monitor signal 13 and outputs the monitor signal 13 to the network management unit 33.

The signal generation unit 5 generates the dummy signal 10 having the same property as the reception signal 9 received from the signal processing unit 36. This property is, for example, the transfer speed and the mark ratio of the reception signal 9. For example, the signal generation unit 5 forcibly generates the AIS signal which is a signal having the same transfer speed as the transfer speed of the reception signal 9 generated by the optical-transceiver, and can adopt this AIS signal as the dummy signal 10. The signal generation unit 5 can start generation of the dummy signal 10 upon receiving a command signal of dummy signal generation from the network management unit 33, or can start an output of the dummy signal 10 generated in advance upon receiving a command signal.

The switch unit 6 receives the reception signal 9 from the signal processing unit 36 and receives the dummy signal 10 from the signal generation unit 5. The switch unit 6 selects any one of the reception signal 9 and the dummy signal 10 based on the switch information included in the command signal 14 from the network management unit 33, and outputs the any one of the reception signal 9 and the dummy signal 10 to the framer, not shown.

The network management unit 33 is connected to the switch unit 6 and the signal processing unit 36 of the optical-transceivers 31, 32, and controls the usage state of the optical-transceivers 31, 32, the currently used system optical fiber 128, and the auxiliary optical fiber 129, based on the monitor signal 13 received from the signal processing unit 36 of the optical-transceivers 31, 32.

In a case where, for example, the network management unit 33 receives, for example, the monitor signal 13 including the abnormality information such as communication interruption of the currently used system optical fiber 128 from the signal processing unit 36 of the optical-transceivers 31, 32, the network management unit 33 transmits, to optical-transceivers 31, 32, switch command information for switching from the currently used system optical fiber 128 to the auxiliary optical fiber 129.

The network management unit 33 further includes the same function as the control unit 7 of FIG. 1 according to the first exemplary embodiment. More specifically, in a case where the control unit 7 receives the monitor signal 13 including the abnormality information from the signal processing unit 36 of the optical-transceivers 31, 32, the control unit 7 outputs, to the switch unit 6, the command signal 14 including the command information for switching the output to the framer from the reception signal 9 to the dummy signal 10. When the monitor signal 13 received from the signal processing unit 36 no longer includes any abnormality information, the network management unit 33 outputs, to the switch unit 6, the command signal 14 including the command information for returning the output to the framer from the dummy signal 10 to the reception signal 9.

Subsequently, the operation procedure of the optical network system 30 that is performed in a case where an abnormality such as communication interruption occurs in the currently used system optical fiber 128 that is being used (X mark above the currently used system optical fiber 128 in FIG. 3) will be explained. In the following explanation, a case of switching from the currently used system optical fiber 128 to the auxiliary optical fiber 129 will be described, but the exemplary embodiment is not limited thereto. The following operation can be applied even in a case where optical fibers are not switched, and the signal processing of the subsequent stage of the optical-transceiver is affected.

In a case where abnormality such as communication interruption occurs in the currently used system optical fiber 128, the signal processing unit 36 of the optical-transceivers 31, 32 detects abnormality of the currently used system optical fiber 128 such as by detecting that the predetermined monitor signal is not input, and outputs the monitor signal 13 including the abnormality information to the network management unit 33.

The network management unit 33 determines that a failure occurs in the currently used system optical fiber 128 by receiving the monitor signal including the abnormality information, and transmits, to the optical-transceivers 31, 32, switch command information for switching from the currently used system optical fiber 128 to the auxiliary optical fiber 129. Therefore, a communication path for communication service is switched from the currently used system optical fiber 128 to the auxiliary optical fiber 129. The switch of the communication path is performed by a path switch unit (not shown) provided in an output unit of an optical signal in the optical-transceivers 31, 32.

Further, the network management unit 33 transmits, to the switch unit 6 of the optical-transceivers 31, 32, a command (command signal 14) for switching the output to the framer from the reception signal 9 including the information about the optical signal to the dummy signal 10, in order to suppress occurrence of failures of communication service from the optical-transceivers 31, 32 to the client side. In this case, the network management unit 33 provides the switch command to the dummy signal 10 before the framer is unable to obtain the information included in the reception signal 9.

In a case where the switch unit 6 of the optical-transceivers 31, 32 receives the switch command to the dummy signal 10, the switch unit 6 of the optical-transceivers 31, 32 switches the output signal to the framer from the reception signal 9 to the dummy signal 10.

On the other hand, when the output signal is switched to the auxiliary optical fiber 129, and the abnormality information is no longer included in the monitor signal 13 received from the signal processing unit 36 of the optical-transceivers 31, 32, the network management unit 33 determines that communication failure of the optical fiber is solved. In this case, the network management unit 33 transmits, to the switch unit 6, a command (command signal 14) for returning an output signal, which is transmitted from the optical-transceivers 31, 32 to the framer, from the dummy signal 10 to the reception signal 9 including information about the optical signal. In this case, the network management unit 33 transmits a switch command to the reception signal 9 at a time when the output signal from the optical-transceivers 31, 32 to the framer is recovered normally or immediately before that time.

In a case where the switch unit 6 of the optical-transceivers 31, 32 receives a switch command to the reception signal 9, the switch unit 6 of the optical-transceivers 31, 32 returns the output signal to the framer from the dummy signal 10 to the reception signal 9.

Like the first exemplary embodiment, the configuration according to the second exemplary embodiment is that the output to the framer is switched to the dummy signal 10 during the time period in which abnormality such as communication interruption occurs, so that unlock in the CDR is less likely to occur, and this reduce the occasion that the framer intermittently repeats generation and non-generation of the electric signal which is to be output to the client side. Therefore, the framer can resume generation of the electric signal without delaying from the reception start processing completion, and an unstable main signal leaking from the framer to the client side can be suppressed.

Therefore, the configuration according to the second exemplary embodiment can also reduce the time period in which the electric signal including information included in the optical signal cannot be generated by the framer, which can also satisfy 50 ms or less as the condition of "switch time" of the specification (ITU-T G.841).

The invention of the present application is not limited to the above exemplary embodiment, and even if there is a change and the like in design within the scope not deviating from the gist of this invention is made, such change is included in this invention. A part or all of the above exemplary embodiment may be described as shown in the following supplementary notes, but is not limited thereto.

[Supplementary Note 1]

An optical-transceiver control apparatus includes:

a signal generation unit for generating a dummy signal having approximately the same property as a reception signal based on an optical signal that is received by an optical-transceiver;

a switch unit for switching an output of the optical-transceiver between the reception signal and the dummy signal; and a control unit, wherein the control unit commands the switch unit to switch the output of the optical-transceiver from the reception signal to the dummy signal when the control unit receives a notification indicating abnormality of the optical signal from the optical-transceiver.

[Supplementary Note 2]

The optical-transceiver control apparatus according to supplementary note 1, wherein the control unit commands the switch unit to switch the output of the optical-transceiver from the dummy signal to the reception signal after a predetermined reception processing time period passes since a reception of the notification is stopped.

[Supplementary Note 3]

The optical-transceiver control apparatus according to supplementary note 1 or 2, wherein the control unit performs control so that a time from when a command for switching from the reception signal to the dummy signal is given to the switch unit to when a command for switching from the dummy signal to the reception signal is given is within a predetermined time.

[Supplementary Note 4]

The optical-transceiver control apparatus according to any one of supplementary notes 1 to 3, wherein the property is any one of a transfer speed and a mark ratio.

[Supplementary Note 5]

The optical-transceiver control apparatus according to supplementary note 1 or 2, wherein the dummy signal is any one of an AIS signal, a program pattern signal, and a clock signal.

[Supplementary Note 6]

An optical network system including:

an optical-transceiver including:

a transmission and reception unit for transmitting and receiving an optical signal transmitted through an optical fiber;

a signal processing unit for converting an optical signal received by the transmission and reception unit into an electric signal, and outputting the electric signal to a client side;

a signal generation unit for generating a dummy signal having approximately the same property as the electric signal; and a switch unit for switching the electric signal and the dummy signal and outputting the electric signal and the dummy signal, a network management unit for commanding the switch unit to switch an output of the optical-transceiver from the electric signal to the dummy signal, based on a notification indicating abnormality of the optical signal from the optical-transceiver.

[Supplementary Note 7]

The optical network system according to supplementary note 6, wherein the network management unit commands the switch unit to switch the output of the optical-transceiver from the dummy signal to the electric signal after a predetermined reception processing time period passes since reception of the notification is stopped.

[Supplementary Note 8]

The optical network system according to supplementary note 6 or 7, wherein the network management unit performs control so that a time from when a command for switching from the electric signal to the dummy signal is given to the switch unit to when a command for switching from the dummy signal to the output signal is given is within a predetermined time.

[Supplementary Note 9]

An optical-transceiver control method including:

generating a dummy signal having approximately the same property as a reception signal based on an optical signal that is received by an optical-transceiver; and switching an output of the optical-transceiver from the reception signal to the dummy signal when receiving a notification indicating abnormality of the optical signal from the optical-transceiver.

[Supplementary Note 10]

The optical-transceiver control method according to supplementary note 9, wherein the output of the optical-transceiver is switched from the dummy signal to the reception signal after a predetermined reception processing time period passes since reception of the notification is stopped.

INDUSTRIAL APPLICABILITY

The invention of the present application can be widely applied to a system using an optical-transceiver for transmitting and receiving various kinds of information between a line side and a client side by converting an electric signal and an optical signal as necessary.

This invention claims the priority based on Japanese Patent Application No. 2014-065990 filed on Mar. 27, 2014, and the entire disclosure thereof is incorporated herein by reference.

REFERENCE SIGNS LIST 1 optical-transceiver control circuit
5 signal generation unit
6 switch unit
7 control unit
9, 127 reception signal
10 dummy signal
11 command signal
12 monitor signal
30 optical network system
31, 32 optical-transceiver
33 network management unit
35 transmission and reception unit
36 signal processing unit
50 conduction
51, 130, 135 non-conduction
52, 53, 56 time
71 AIS signal
73, 138 non-generation
74, 75 time
100 framer
105 CDR
110 optical-transceiver
121, 122, 125, 126 electric signal
123, 124 main signal
128 currently used system optical fiber
129 auxiliary optical fiber
131, 136, 137 region
132 time lag
139 waiting time period

The invention claimed is:

1. An optical-transceiver control circuit comprising:
a signal generation unit that generates a dummy signal having approximately the same property as an electric signal generated from an optical signal that is input to an optical-transceiver;
a switch unit that receives the electric signal, and selects and outputs any one of the received electric signal and the generated dummy signal; and
a control unit that changes a selection target of the switch unit from the electric signal to the dummy signal when a notification indicating abnormality of the optical signal is input,
wherein
the control unit changes the selection target of the switch unit from the dummy signal to the electric signal after a predetermined time period passes since a notification indicating abnormality of the optical signal is no longer input, and
wherein
the predetermined time period is shorter than a time it takes for the optical-transceiver to perform reception start processing.

2. The optical-transceiver control circuit according to claim 1, wherein the property is any one of a transfer speed and a mark ratio.

3. The optical-transceiver control circuit according to claim 1 or 2, wherein the dummy signal is any one of an AIS signal, a program pattern signal, and a clock signal.

4. The optical-transceiver control circuit according to claim 2, wherein the dummy signal is any of an AIS signal, a program pattern signal, and a clock signal.

5. An output control method of an optical-transceiver, comprising:
receiving an electric signal generated from an optical signal that is input to an optical-transceiver;
generating a dummy signal having approximately the same property as the electric signal;
changing an output target from the electric signal to the dummy signal when a notification indicating abnormality of the optical signal is input; and
changing the output target from the dummy signal to the electric signal after a predetermined time period passes since the notification indicating abnormality of the optical signal is no longer input,
wherein
the predetermined time period is shorter than a time it takes for the optical-transceiver to perform reception start processing.

6. The output control method according to claim 5, wherein the property is any one of a transfer speed and a mark ratio.

7. The output control method according to claim 5, wherein the dummy signal is any one of an AIS signal, a program pattern signal, and a clock signal.

8. The output control method according to claim 6, wherein the dummy signal is any one of an AIS signal, a program pattern signal, and a clock signal.

* * * * *